United States Patent [19]
Le Van

[11] 3,944,855
[45] Mar. 16, 1976

[54] METHOD AND APPARATUS FOR GENERATING ELECTRICITY BY VEHICLE AND PEDESTRIAN WEIGHT FORCE

[75] Inventor: Wayne P. Le Van, New York, N.Y.

[73] Assignee: Van Allyn, Inc., New York, N.Y.

[22] Filed: Dec. 12, 1974

[21] Appl. No.: 532,046

[52] U.S. Cl................. 310/69; 340/38 R; 310/75 R
[51] Int. Cl.² .......................................... H02K 7/06
[58] Field of Search ............ 310/15, 30, 69, 75, 83; 340/38 R

[56] References Cited
UNITED STATES PATENTS

| | | | |
|---|---|---|---|
| 1,972,534 | 9/1934 | Olafson | 340/38 R |
| 1,975,527 | 10/1934 | Zeiger | 340/38 R |
| 2,119,811 | 6/1938 | Green | 310/15 |
| 3,699,367 | 10/1972 | Thomas | 310/69 |
| 3,839,654 | 10/1974 | Madelmont et al. | 310/75 |

Primary Examiner—Donovan F. Duggan

[57] ABSTRACT

A method and apparatus for producing useful work by a traffic-way or roadway having a moveable portion that can be readily displaced by the weight of traffic passing thereover, and translating the displacement of the moveable portion into useful work; e.g., to effect the drive of an electric generator or a drive shaft. This is attained essentially by interposing a transmission between the moveable roadway portion and work producing drive which will effect a unidirectional rotation or actuation of a work producing drive as the moveable roadway is moved between a loaded and unloaded position.

2 Claims, 4 Drawing Figures

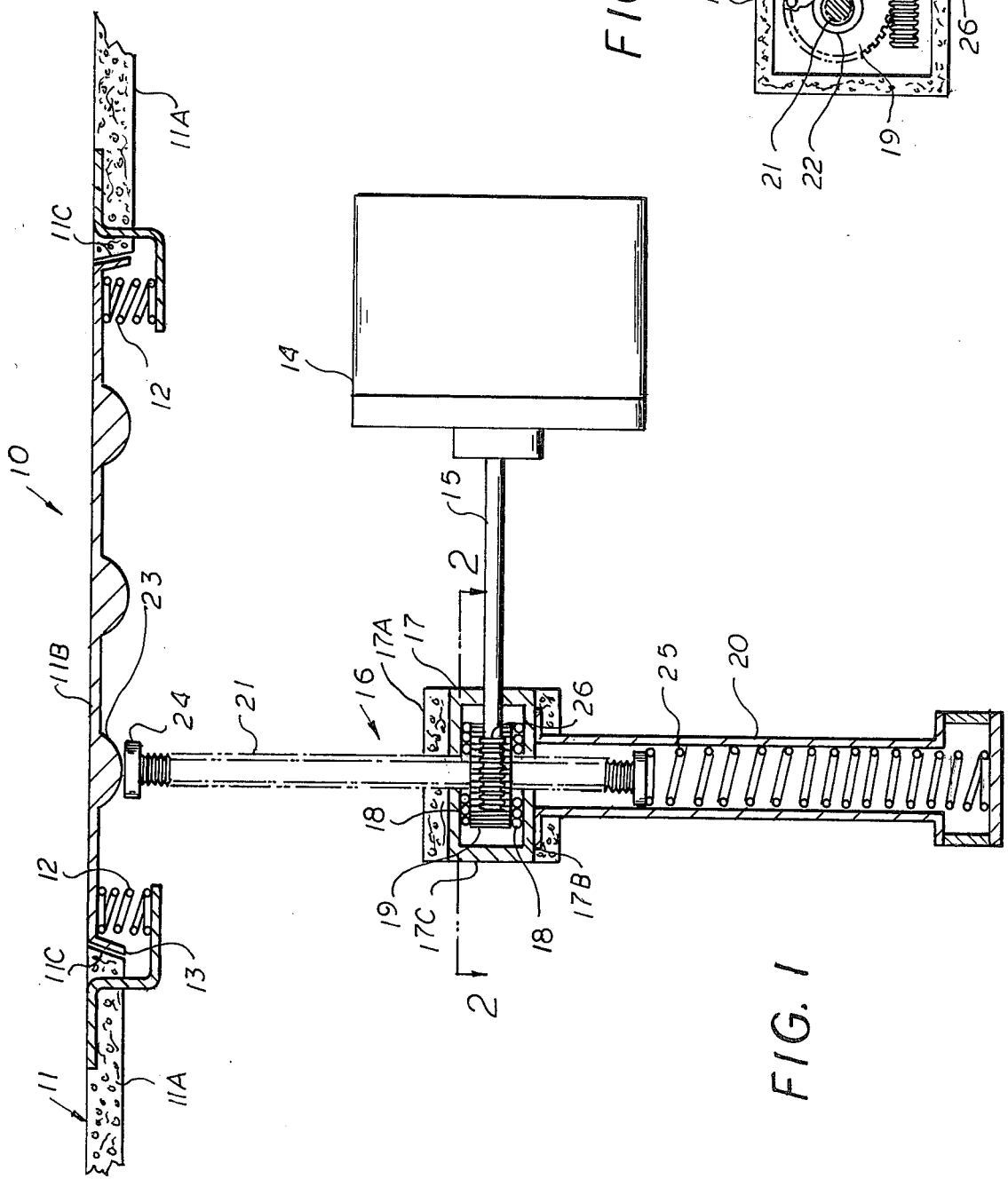

METHOD AND APPARATUS FOR GENERATING ELECTRICITY BY VEHICLE AND PEDESTRIAN WEIGHT FORCE

PROBLEM & PRIOR ART

Over the years many methods and apparatuses have been proposed producing useful work; e.g., for generating an electrical current. Generally, conventional forms of energy; e.g., wind, water, solar, nuclear, or steam power produced by burning conventional fuels such as coal, oil and gas have been used to turn the generators for producing electrical power or other work producing machines. All of these methods required a power source which required relatively large cpaital investment or expense.

OBJECTS

An object of this invention is to provide a method and apparatus for producing electrical energy or useful work which is not dependent on the need of fuel such as coal, oil or gas.

Another object of this invention is to provide a method and apparatus for producing electrical energy or useful work by utilizing a source of power which heretofore has not been practically utilized for any purpose.

Another object is to provide a method and apparatus for utilizing the relative unlimited source of moving traffic; e.g., vehicle or pedestrian traffic, to generate useable electrical energy or useful work.

BRIEF SUMMARY OF INVENTION

The foregoing objects and other features and advantages are attained by a method and apparatus of utilizing the weight of moving traffic; e.g., vehicle or pedestrian traffic to generate electricity or to do useful work. This is attained by making a traffic-way or roadway with a segment or portion which can be readily displaced as a vehicle or pedestrian passes thereover. Operatively associated with such moveable roadway portion is a work producing machine; e.g., generator and a transmission means interposed between the work producing machine and moveable roadway or portion. The arrangement is such that the transmission means will translate the deflection and/or displacement of the moveable roadway portion between a loaded and unloaded position so as to result in the production of useful work. In one form of the invention, the transmission means includes a driving gear which is connected into driving relationship with the drive shaft or an armature of a generator. The driving gear in turn is connected in driving relationship through a unidirection clutch to a reciprocating member which is operative to translate the reciprocal displacement of the moveable roadway into a driving force to effect the drive of the driving gear and connected generator armature or drive shaft to produce work. The resulting electricity produced such by such generator can be used for lighting highways, and streets, electrical appliances, and buildings adjacent the roadway. The electrical power thus produced could also be used to charge batteries to provide the requisite electrical power supply during periods of slow traffic conditions and/or batteries for various other applications and uses.

In another form of the invention the transmission means may comprise a magnetic member which is moveable relative to a coil to generate an electrical current; as the moveable portion of the roadway is deflected between a loaded and unloaded position.

FEATURES

A feature of this invention resides in the provision wherein an untapped source of energy, e.g., moving vehicles or pedestrian traffic can be utilized to generate electrical power or to produce other useful work.

Another feature resides in the provision of operatively connecting a moveable portion of a roadway, which can be readily displaced by the traffic loading imposed therein to a drive shaft and translating such displacement to power or a drive shaft of a work producing machine.

Another feature resides in the provision wherein electrical energy can be produced relatively close to its ultimate place of use and thereby minimize the need for high tension lines by utilizing of energy of moving traffic.

Other features and advantages will become more readily apparent when considered in view of the drawings and specification in which:

FIG. 1 is a diagramatic showing of an apparatus embodying the invention in which parts are shown in section.

FIG. 2 is a sectional view of a detail of construction taken along line 2—2 on FIG. 1.

DETAILED DESCRIPTION

Figure 3:
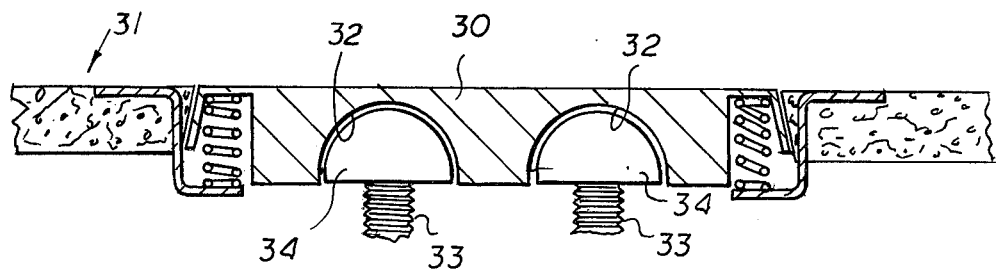
FIG. 3 is a detail of construction of a modified embodiment.

This invention is directed to a method and apparatus of producing useful work; e.g., generating electrical energy by utilizing the power or weight of moving traffic to turn an electrical generator. This is attained by constructing a traffic way or roadway over which traffic flows with a moveable portion or segment which is displaced as the weight of traffice flows thereover. The displacement of the moveable segment or portion of the roadway is then translated to rotary power to effect the drive of the genrator for generating electrical current; or to produce the drive of other work producing machines.

Referring to the drawings there is shown an apparatus 10 for generating electricity in accordance to the described method. As shown, a roadway or traffic way 11 over which either vehicles and/or pedestrian traffic flows, includes a fixed portion 11A and a relatively moveable portion or segment 11B. The moveable portion 11B comprises a segment or grating of the roadway that is resiliently mounted on suitable springs 12. In the illustrated embodiment the moveable segment 11B is provided with a peripherial frame 13 which has an inclined or tapered edge and which complements like inclined surfaces 11C formed on the adjacent fixed portion of the roadway 11A. The complementary tapers, as will be hereinafter noted, provides a guiding means for locating the moveable segment 11B relative to the fixed portion 11A when placed in operation. It will be understood that the springs 12 exert a spring bias on the moveable segment 11B which will normally urge the segment 11B toward an inoperative position wherein the top surface of the moveable segment 11B is level with the top surface of the fixed portion 11A of the roadway. The force which the springs 12 exert on segment 11B is such that the weight of a vehicle or moving body traveling over the moveable portion 11B will compress the springs 12 thus permitting the moveable portion 11B to be displaced a predetermined amount depending on the load or weight of the moving traffic imposed thereon.

An electrical generator 14 for generating an electrical current is operatively connected with the moveable segment 11B of the roadway 11. The genrator includes a drive shaft 15 which is connected to the generator armature.

Interconnected between the moveable portion 11B of the roadway 11 and the generator 14 is a transmission means 16 for translating the periodic displacement of the moveable segment 11B, as traffic flows thereover, into the power or source necessary to drive the drive shaft 15 of the generator 14.

As shown the transmission means 16 includes a housing 17 disposed beneath the moveable portion 11B of the roadway. The housing 17 is defined by an upper and lower end wall 17A, 17B and an interconnecting circumscribing peripheral wall 17C; and it is supported on the end of a tubular support or pedestal 20. Rotatably journalled between the end walls 17A, 17B of the housing, and between suitable bearings 18, 18 is a driving gear 19.

Operatively associated with the driving gear 19 is an activating screw member 21. The screw member 21 is connected in driving relationship with the driving gear 19 through unidirectional or one way 22 i.e., a clutch which when rotated in one direction is in engaged driving relationship and which when rotated in the opposite direction is in a disengaged free-wheeling relationship with respect to the driving gear 19.

The arrangement is such that upon the downward displacement of the screw member 21, as shown in FIG. 1, it will cause the clutch 22 to engage the driving gear 19 to effect the drive or rotation thereof. Upon the return of the screw member 21, the arrangement is such that the clutch disengages the driving gear 19. Thus the reciprocal movement of the screw member 21 is such that it will effect the unidirectional drive of the driving gear 19.

As shown in FIG. 1, the under surface of the moveable segment 11B is provided with a contact surface 23 which is arranged to normally engage the end cap 24 connected to the upper end of the screw member 21. The other end of the screw member 21 engages a spring member 25 which normally maintains the screw member 21 biased toward its inoperative position as shown in FIG. 1.

Disposed in meshing relationship with the driving gear 19 is a driven gear 26 which is connected to the drive shaft or armature 15 of the generator 14; or to the drive shaft of some other work producing machine.

In operation, it will be noted that as a vehicle moving over the fixed portion 11A of the roadway and onto the moveable segment 11B, the weight of the vehicle will overcome the bias of springs 12 supporting the moveable section 11B, thus causing its downward displacement; the amount of displacement being determined by the load of the vehicle and the resistance of springs 12. Displacement of the moveable section 11B in turn effects a corresponding displacement of the screw member 21; thereby causing the clutch 22 to engage the driving gear 19 and effecting the drive of gear 19. The rotation of the driving gear 19 in turn is transmitted to the driven gear 26 and connected drive shaft 15 to drive the generator, or other machine.

Upon removal of the load from the moveable segment 11B of the roadway, the springs 12 will cause the moveable segment 11B to be returned to normal inoperative position. The return spring 25 operating on the screw member 21 causes the screw member 21 to be also returned to normal inoperative position. Because of the unidirectional clutch arrangement described, the screw member 21 can be readily returned to its normal position without interference with the drive of the driving gear 19; as the clutch 22 is disengaged from gear 19 on the return stroke of the activating screw 21.

It will be apparent that a steady flow of traffic over the moveable segment 11B can maintain the generator in continuous operation. If desired the generator may be connected to batteries so that the batteries can be readily charged by the generator when actuated in the manner herein described. The batteries can then supply the necessary electrical energy in the event the flow of traffic during a particular time interval is insufficient to maintain the desired electrical output of the generator.

While the apparatus shown has been described with respect to a roadway or traffic way over which vehicle traffic flows, it will be understood that the invention can be readily applied to pedestiran traffic. Thus sidewalks, street crossings, parks, and even portions of buildings, e.g., corridors, halls, stairways, entrance halls, and the like can be installed with a moveable segment 11B and associated transmission means 16 whereby the weight of a pedestrian is utilized to drive a generator 14.

FIG. 3 illustrates a modified detail of construction. In this form of the invention the moveable portion 30 of the traffic way 31 is provided with one or more concave grooves 32 formed on the under surface thereof. Connected to the top of the activating screw 33 is an end cap 34 shaped to complement the concave groove 32. It will be noted, as shown in FIG. 2 that one or more concave grooves 32 and associated screws 33 may be provided.

In such an arrangement, the respective screws 33 can be utilized to complement the drive of a common generator or in the alternate, the respective screws 33 can effect the drive of separate generators. The complementary concave-convex geometry of the grooves 32 and end caps 34 define a positive contact between the moveable portion 30 and the end caps 34 when the moveable portion 30 is displaced.

An alternate construction can utilize a magnetic force to effect the return of the moveable segment of the traffic-way to its inoperative position. This is attained by incorporating a permanent magnet of opposite polarity to maintain the moveable section in the normal inoperative position. The moveable section may be permanently magetized, which when weighted by moving traffic is displaced to activate the screw member. Upon the unloading of the moveable section, the magnetic attraction will effect the instant return of the moveable section.

In all other respects the construction and operation of the alternate constructions are similar to that hereinbefore described with respect to FIG. 1 and FIG. 2.

Figure 4:
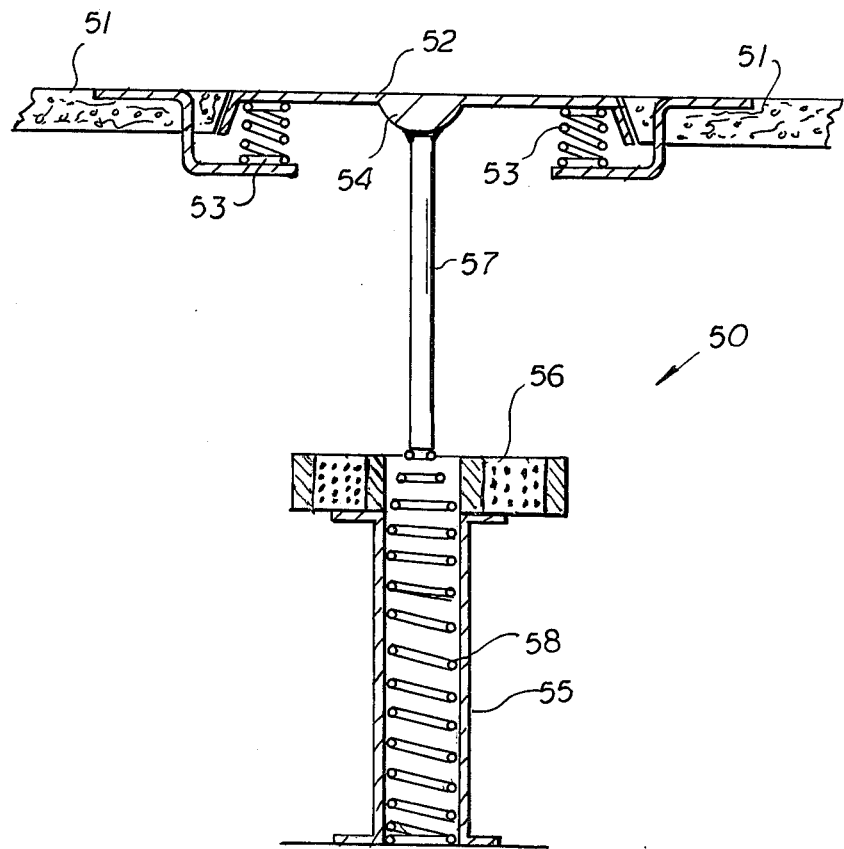
FIG. 4 is another modified embodiment of the invention.

FIG. 4 illustrates another modified construction 50. In this form of the invention, the moveable portion 52 of the roadway or traffic-way 51 is supported on springs 53 as hereinbefore described.

Disposed below the moveable portion 52 is a pedestal 55 which supports thereon a coil 56. In contact with the moveable portion 52 of the roadway is a transmission member in the form of a bar magnet 57 arranged to move into and out of the coil 56 as the moveable portion is displaced. Operating on the bar magnet is a spring 58 to effect the return of the bar magnet as the moveable portion 52 assumes its normal inoperative position. It will thus be evident that the reciprocal movement of the bar magnet 57 relative to the coil 56 as the moveable portion 52 of the traffic-way 51 is displaced by the weight of the traffice flowing thereover will generate an electric current which can be readily utilized.

From the foregoing, it will be apparent that a heretofore unlimited and untouched form of energy has been utilized to generate electrical power. In addition, the work produced at the end of the drive shaft 15 may be harnessed to perform other useful type of work other than generating electricity.

There is no particular limit as to the number of moveable sections which can be incorporated in a particular roadway or traffic-way.

While the invention has been described with respect to a particular embodiment thereof, it will be readily understood and appreciated that variations and modifications may be made within the scope and spirit of the invention.

What is claimed is:

1. An apparatus for generating electrical energy comprising:
   a traffic way over which traffic is permitted to flow,
   said traffic way having a relatively fixed portion and a moveable portion,
   means for resiliently supporting said moveable portion for movement relative to said fixed portion,
   an electrical generator having a drive shaft,
   and transmission means interposed between said drive shaft and said moveable portion of said roadway whereby the movement of said moveable portion is translated to said drive shaft to effect the rotation thereof,
   said transmission means including a driving gear,
   a screw,
   a one way clutch connecting said screw in driving relationship with said driving gear,
   a driven means disposed in driving relationship with said driving gear,
   said driven means being connected to said drive shaft,
   said screw being operatively disposed relative to said moveable portion of said traffic way whereby the displacement of said moveable portion effects the displacement of said screw to effect the drive of said driving gear,
   and means acting on said screw to return said screw to its inoperative position as said moveable portion is restored to its initial position.

2. An apparatus utilizing the energy of moving traffic to generate electricity comprising:
   a roadway having a fixed portion and a moveable portion,
   means for resiliently supporting said moveable portion for movement relative to said fixed portion whereby the weight of a body travelling over said moveable portion will effect the displacement thereof,
   an electrical generator having a drive shaft for generating electricity,
   a transmission means interposed between said moveable portion and said drive shaft whereby the displacement of said moveable portion effects the rotation of said drive shaft, and
   said transmission means including a unidirection drive to effect the rotation of said drive shaft in the one direction as said moveable portion of said roadway is moved between an unloaded normal position and a loaded displaced position,
   said transmission means comprising:
   a gear housing,
   a drive gear rotatably journalled in said housing,
   a driven member disposed in driving relationship with said drive gear,
   said driven member being operatively connected to the drive shaft of said generator,
   a screw member disposed relative to said moveable portion to be displaced as said moveable portion is displaced by the loading imposed thereon,
   a one way drive connecting said screw in driving relationship to said driving gear,
   means for biasing said screw toward its normal, inoperative position,
   and said fixed portion and moveable portion having complementary contiguous inclined mating surfaces to provide a guide for said moveable portion.

* * * * *